United States Patent Office 3,421,914
Patented Jan. 14, 1969

3,421,914
PROCESS FOR MAKING POROUS, LIGHT-WEIGHT ZIRCONIA BODIES
Weston Andrew Hare, Northfield, Wilmington, Del., assignor to E. I. du Pont de Nemours and Company, Wilmington, Del., a corporation of Delaware
No Drawing. Continuation-in-part of application Ser. No. 317,763, Oct. 21, 1963. This application Jan. 8, 1968, Ser. No. 696,117
U.S. Cl. 106—40          5 Claims
Int. Cl. B28b *1/50;* C04b *43/00;* B28b *11/00*

ABSTRACT OF THE DISCLOSURE

A process for making a porous refractory material by mixing particles of an acid-soluble refractory material, e.g., magnesia, with particles of zirconia, molding to form a shaped object, firing, and then extracting the acid-soluble refractory material from the fired shape.

CROSS-REFERENCE TO RELATED APPLICATIONS

This application is a continuation-in-part of my copending application Serial No. 317,763, filed Oct. 21, 1963, now abandoned.

BACKGROUND AND BRIEF SUMMARY OF THE INVENTION

This invention relates to methods of making strong, porous refractory bodies suitable for use at high temperatures.

Various ways of producing lightweight refractories are well known. These include firing a foam, use of a gas producing agent or combustible organic materials in the refractory mix, and the proper selection of initial grain size of the refractory used. All of these have the disadvantage that the bonding of the refractory aggregate occurs under conditions of low density so that optimum sintering or bonding of the refractory grains is not obtained. Hence, such products are much weaker than one would anticipate from their porosity alone. These products also suffer from the disadvantage that the pore size in the final product cannot be readily controlled.

The present invention provides a method for making a porous refractory of zirconia having improved strength.

This object has been attained by a process for making a porous refractory material comprising the steps I. Making a refractory composition comprising A. 20 to 60% of an acid-soluble refractory material (preferably magnesia) that is retained on a 60-mesh sieve and passes a 10-mesh sieve (preferably 20/60 mesh), B. 80 to 40% of zirconia and a stabilizer, II. Molding a shape from the composition of I of relatively low porosity, III. Firing the molded shape to obtain a well bonded structure, IV. Extracting acid-soluble refractory material from the fired shape.

A preferred composition is 35 to 55% of coarse grain magnesia, and 65 to 45% of a mixture of powdered unstabilized zirconia and powdered calcium cyanamide. The calcium cyanamide is present in the amount of 4 to 26% of the weight of zirconia.

The acid-soluble refractory material should have a melting point above 1500° C. and preferably greater than the highest temperature encountered during the firing. The material should be dense and have a high crushing strength so that it retains its shape during the molding operation. It should also be form stable during firing. Oxides of the alkaline earths are suitable, especially magnesium and calcium. Oxides of the rare earths, e.g., cerium, and of metals such as zinc can be used. A mixture of oxides such as calcined dolomite or a solid solution of oxides, such as FeO and MgO may be used. If this material (e.g. CaO) reacts with water, the refractory composition should be kept substantially dry (of water) during the mixing and molding operations.

In some cases, grains of acid-soluble oxides in a low density form (porous) may be used as the pore former since this form is more readily dissolved out.

The refractory material should be of a particle size so that it is retained on a 60-mesh sieve and passes a 10-mesh sieve. A preferred range is from 20 to 60 mesh. The exact distribution of the grains can be selected, based on the distribution of the pores that are desired in the final product.

By an acid-soluble refractory material is meant a substance that will dissolve in 10% aqueous HCl at 25° C. after the refractory material has been subjected to firing conditions equivalent to that used in the process.

Where magnesia is used, it can be calcined magnesite, the so-called Solvay magnesia, magnesia obtained from sea water, electrically fused magnesia or periclase itself. Impurities which do not contaminate the $ZrO_2$ to an undesirable degree or cause melting of the MgO grains at firing temperature may usually be tolerated since they will be removed during the extraction.

The zirconia present in the final structure should be in a stabilized form, i.e., having predominantly a crystalline cubic form. For some purposes as much as 20 or 30% of the zirconia can be in the monoclinic form. Preferably, unstabilized zirconia with a stabilizing agent is used although a stabilized zirconia is suitable.

When using an unstabilized zirconia it is preferably pure. High grade Baddeleyite ores can be used. The zirconia should have a particle size of from 100 to 300 or finer mesh and preferably 200 to 300 mesh and finer.

Stabilizers for zirconia are well known (see "Oxide Ceramics" by E. Ryshkewitch, published by Academic Press of New York in 1960). Calcium oxide is an especially useful stabilizer and even more preferred are compounds which yield calcium oxide during the firing reaction such as calcium carbonate, calcium hydroxide, and calcium cyanamide ($CaCN_2$). These calcium compounds should be present in the amount (calculated as calcium oxide) of from about 3 to 18% based on the weight of the pure zirconia present. Stabilizers should have a particle size of from 200 to 300 and finer mesh. The same substance may be used for both a stabilizer and the acid soluble refractory providing the particle size requirements are met.

It may be desirable to use minor amounts of water, alcohol, ethylene glycol, aqueous solutions of carboxymethyl cellulose, gum arabic, polyvinyl alcohol, natural gums, glue and the like, organic solvent solutions of rubber and the like to increase the green strength of the shaped objects. Such temporary binders should be intimately mixed with the refractory batch.

The refractory batch is shaped at from 1000 to about 20,000 pounds/inch² pressure. If a binding agent has been used, the shaped form should be dried until most of the volatile material in the binder has been removed. The dried shapes will be fired at temperatures of from over 1,400 to 1,600° C. or higher for a period of 1 to 24 hours. The shapes should maintain a porosity of 45 to 25% or lower during the firing operation in order to achieve optimum strength. Normally an oxidizing atmosphere will be maintained during firing but in some cases a reducing atmosphere or inert atmosphere may be used.

The fired shapes are extracted by suitable acids such as dilute formic acid, dilute acetic acid, dilute hydrochloric acid (10%), dilute nitric acid or other strong acids forming soluble salts with the soluble material until the degree of porosity desired is obtained. It is possible to leave some of the acid-soluble refractory present in the brick.

Although thin sections up to ½" thick may be extracted in a reasonable length of time by circulated acid solution, larger sections may require a longer time or the use of a forced flow of acid extractant through the section by means of a hydrostatic head of extractant liquid over the sample.

The products of this invention are useful as thermal insulating panels and the like.

Testing procedures

All sieve measurements are made with U.S. Sieve Series.

Apparent densities are determined by weighing the body in air and measuring the mass volume of the body including open and closed pores.

Flexural strength reported as pounds per square inch (p.s.i.) is measured according to ASTM Standard 1958, part 4, page 670, test C293–57T with the use of a span width of 1 to 4 inches.

EXAMPLE I

A mixture of 12.5 parts $CaCN_2$ (100% pure equivalent to 8.75 parts CaO) of −200 mesh and 87.5 parts purified zirconia of 200 to −300 mesh is sifted together three times to obtain a uniform mix. This mixture is then further mixed with varying amounts of dead burnt magnesite (98% MgO) of 20/40 mesh size, as set forth in Items a, b, and c of Table I below. A 30% aqueous solution of gum arabic is added in the amount of about 0.1 part by weight of solution to 1 part of the refracory mix. The mixture is pressed at 5,000 p.s.i. to discs 2.25 inches in diameter by 0.25 inch thick. The discs are dried overnight in a vacuum oven at 120° C. The dried discs have apparent densities of 2.6 to 2.7 grams per cm.³ which corresponds to a porosity of aobut 36 to 38%. The dried discs are heated to 1500° C. from room temperature in about 24 hours. They are fired for an additional 2 hours at 1500° C. and then cooled. The physical properties are measured on samples of the fired discs and the fired pieces then extracted with 12.5% aqueous formic acid at about 90° C. by continuously pumping the acid solution over the disc. The extracted samples are rinsed in water and dried. Physical properties are given in Table I. X-ray analysis of the as-fired and the extracted samples shows the zirconia is all present as the cubic crystalline form.

The use of combustible organic materials as pore formers such as graphite, styrene or polyvinyl acetate beads yield bodies with apparent densities of from 1.1 to 1.8 grams per cm.³ but where styrene or polyvinyl acetate beads were used the flexural strengths obtained range from too weak to test (i.e., less than 20 p.s.i.) to a maximum of about half the strength obtained by the present invention. It is also observed that samples made using combustible materials as pore formers tend to shrink unevenly giving distorted products not observed by use of the present invention. For example, where grapihte was employed, the samples had high shrinkage (30–40%) and hence lacked form stability during firing. Items a, b, and c show substantially higher flexural strengths and increased form stability during firing at comparable apparent density values to the above. These items shrunk 10% in volume during firing compared to 30% or more shrinkage when a combustible pore former was used.

Item d is made in the same manner as item a but with the use of the same magnesia having a particle size of 40 to 60 mesh.

Item e is made by replacing the magnesia of item c with an electrically fused magnesia (98% MgO) with a particle size of 20 to 40 mesh and firing at 1500° C. for 24 hours.

Similar products are made by replacing the magnesia with granular calcium oxide and calcium carbonate with a particle size of 10 to 40 mesh; mixing with a nonaqueous binder, molding, firing and extracting as above.

Item f is made by replacing the gum arabic in item a with a larger amount of water to give the consistency of a thick putty. The water is removed by molding the sample on a plaster of Paris block followed by drying and the sample is fired.

TABLE I

| Item | $ZrO_2$+ $CaCN_2$, percent | MgO, percent | Properties fired | | Properties extracted | |
|---|---|---|---|---|---|---|
| | | | Density | Flexural strength, p.s.i. | Density | Flexural strength, p.s.i. |
| a | 50 | 50 | 2.9 | 1,200 | 1.6 | 220 |
| b | 43 | 57 | 2.9 | 1,950 | 1.2 | 220 |
| c | 55 | 45 | 2.9 | 990 | 1.7 | 560 |
| d | 50 | 50 | 2.7 | 1,570 | 1.7 | 240 |
| e | 55 | 45 | 3.0 | 1,000 | 1.7 | 500 |
| f | 55 | 45 | 2.6 | 1,250 | 1.4 | 750 |

What is claimed is:

1. A method for making a porous refractory material consisting essentailly of mixing from about 20–60% of an acid-soluble refractory material selected from the group consisting of the alkaline earth oxides, rare earth oxides, zinc oxide, and mixtures and solid solutions thereof, having a particle size that passes a 10-mesh sieve but is retained on a 60-mesh sieve with from about 40–80% of zirconia, molding a shaped object from said composition at a pressure of from about 1,000 to 20,000 pounds per square inch, firing the molded shape at a temperature of over 1,400° C. to 1,600° C. while maintaining a porosity of 25 to 45% to obtain a well-bonded structure and extracting the acid-soluble refractory material from the fired shape.

2. The process of claim 1 wherein a stabilizer is present in an amout of from about 3–18% based on the weight of the zirconia.

3. The process of claim 2 wherein the zirconia has a particle size of from 100–300 mesh and finer and the stabilizer has a particle size of from 200–300 mesh and finer.

4. The process of claim 2 wherein the acid-soluble refractory material is magnesia.

5. The process of claim 2 wherein the stabilizer is selected from the group consisting of calcium oxide and compounds which yield calcium oxide during the firing reation.

References Cited

UNITED STATES PATENTS

| | | | |
|---|---|---|---|
| 1,578,900 | 3/1926 | Lubowsky | 264—44 |
| 2,593,507 | 4/1952 | Wainer | 106—41 |
| 2,910,371 | 10/1959 | Ryshkewitsch | 106—58 |
| 3,202,518 | 8/1965 | Whittemore | 106—40 |

HELEN M. McCARTHY, Primary Examiner.

U.S. Cl. X.R.

106—41, 57, 58